(12) United States Patent
Arulmozhi et al.

(10) Patent No.: US 12,205,115 B2
(45) Date of Patent: Jan. 21, 2025

(54) DATA MINING FRAMEWORK FOR SEGMENT PREDICTION

(71) Applicant: PAYPAL, INC., San Jose, CA (US)

(72) Inventors: Suraj Arulmozhi, Chennai (IN); Ashok Subash, Sirkazhi (IN); Deepak Mohanakumar Chandramouli, Milpitas, CA (US); Gayathri Baskaran, Santa Clara, CA (US); Romil Varadkar, Bangalore (IN)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 18/050,241

(22) Filed: Oct. 27, 2022

(65) Prior Publication Data

US 2024/0095738 A1 Mar. 21, 2024

(30) Foreign Application Priority Data

Sep. 15, 2022 (IN) .............................. 202241052672

(51) Int. Cl.
*G06Q 20/40* (2012.01)
*G06Q 20/38* (2012.01)

(52) U.S. Cl.
CPC ......... *G06Q 20/401* (2013.01); *G06Q 20/382* (2013.01); *G06Q 20/389* (2013.01)

(58) Field of Classification Search
USPC .......................................................... 705/44
See application file for complete search history.

(56) References Cited

U.S. PATENT DOCUMENTS

| 5,787,274 | A  | * | 7/1998  | Agrawal et al. ............... 395/613 |
| 10,339,465 | B2 | * | 7/2019  | Steele et al. ........... G06N 20/00 |
| 2015/0379426 | A1 | * | 12/2015 | Steele et al. ......... G06N 99/005 |
| 2019/0310650 | A1 | * | 10/2019 | Halder ................. G05D 1/0221 |
| 2019/0378010 | A1 | * | 12/2019 | Morris et al. ............ G06N 3/08 |

(Continued)

FOREIGN PATENT DOCUMENTS

CA 2953817 * 7/2023 ............. G06N 20/00

OTHER PUBLICATIONS

N. Jovanovic et al., Foundations of Predictive Data Mining, Jan. 1, 2002, IEEE Xplore, 6th Seminar on Neural Network Applications in Electrical Engineering (2002, pp. 53-58). (Year: 2002).*

*Primary Examiner* — Scott C Anderson
*Assistant Examiner* — George N. Proios
(74) *Attorney, Agent, or Firm* — Haynes and Boone, LLP

(57) ABSTRACT

Methods and systems are presented for mining data in association with predicting occurrences of events. Upon detecting an occurrence of an event associated with a transaction, a data mining system accesses data associated with different transactions, and generates a decision tree for predicting occurrences of the event based on the data. Using a classification specification, the data mining system traverses the decision tree and prunes at least a portion of the decision tree that does not satisfy the classification specification. The data mining system then extracts data relevant to predicting occurrences of the event from the pruned decision tree. The extracted data includes attributes and/or criteria that are relevant to predicting occurrences of the event. Based on the extracted data, one or more actions can be performed to improve the event prediction process and/or reduce the frequency of the occurrences of the event.

20 Claims, 7 Drawing Sheets

(56) References Cited

U.S. PATENT DOCUMENTS

| | | | |
|---|---|---|---|
| 2023/0351383 A1* | 11/2023 | Bar Eliyahu et al. | ........................ G06Q 20/401 |
| 2024/0045410 A1* | 2/2024 | Mani Iyer Ramani | ....................... G05B 23/0221 |
| 2024/0142994 A1* | 5/2024 | Ebrahimi Afrouzi | ........................ G05D 1/6485 |

* cited by examiner

DATA MINING FRAMEWORK FOR SEGMENT PREDICTION

CROSS REFERENCE TO RELATED APPLICATION

The present invention claims priority to India Provisional Patent Application No. 202241052672, filed Sep. 15, 2022, which is incorporated herein by reference in its entirety.

BACKGROUND

The present specification generally relates to data mining, and more specifically, to analyzing and evaluating features for use in classifying data according to various embodiments of the disclosure.

RELATED ART

When one or more anomalies occur among data items, it is often desirable for an organization to determine the cause and/or attributes that lead to the anomalies. For example, when a service provider processes electronic payment transactions, the service provider may detect that some of the payment transactions have experienced a downgrade during the processing of the transactions (e.g., delay or other increased expenses during the processing of the transactions, etc.). The service provider may desire to find out the cause and/or attributes of the payment transactions that could lead to the processing downgrade, such that the service provider can perform actions that can avoid (or reduce the frequency of) downgrades in the future. In another example, certain payment transactions may experience a chargeback event after the transactions have been processed. The service provider may desire to find out the cause and/or the attributes of the payment transactions that could lead to the chargeback events, such that the service provider may perform actions that can avoid (or reduce the frequency of) the chargeback events in the future. Such determinations may then be used by the service provider to predict occurrences of future events or to reduce anomalies.

However, since different types of events may be detected over time, and the factors that lead to the events may change frequently, it is a challenge for the service provider to constantly adapt to new criteria when predicting occurrences of events. For example, the service provider may be required to constantly re-train and/or re-configure a machine learning model for predicting an occurrence of an event due to the dynamic nature of these events. Thus, there is a need for providing a computer-based tool for efficiently identifying and evaluating features for predicting events.

Figure 1:
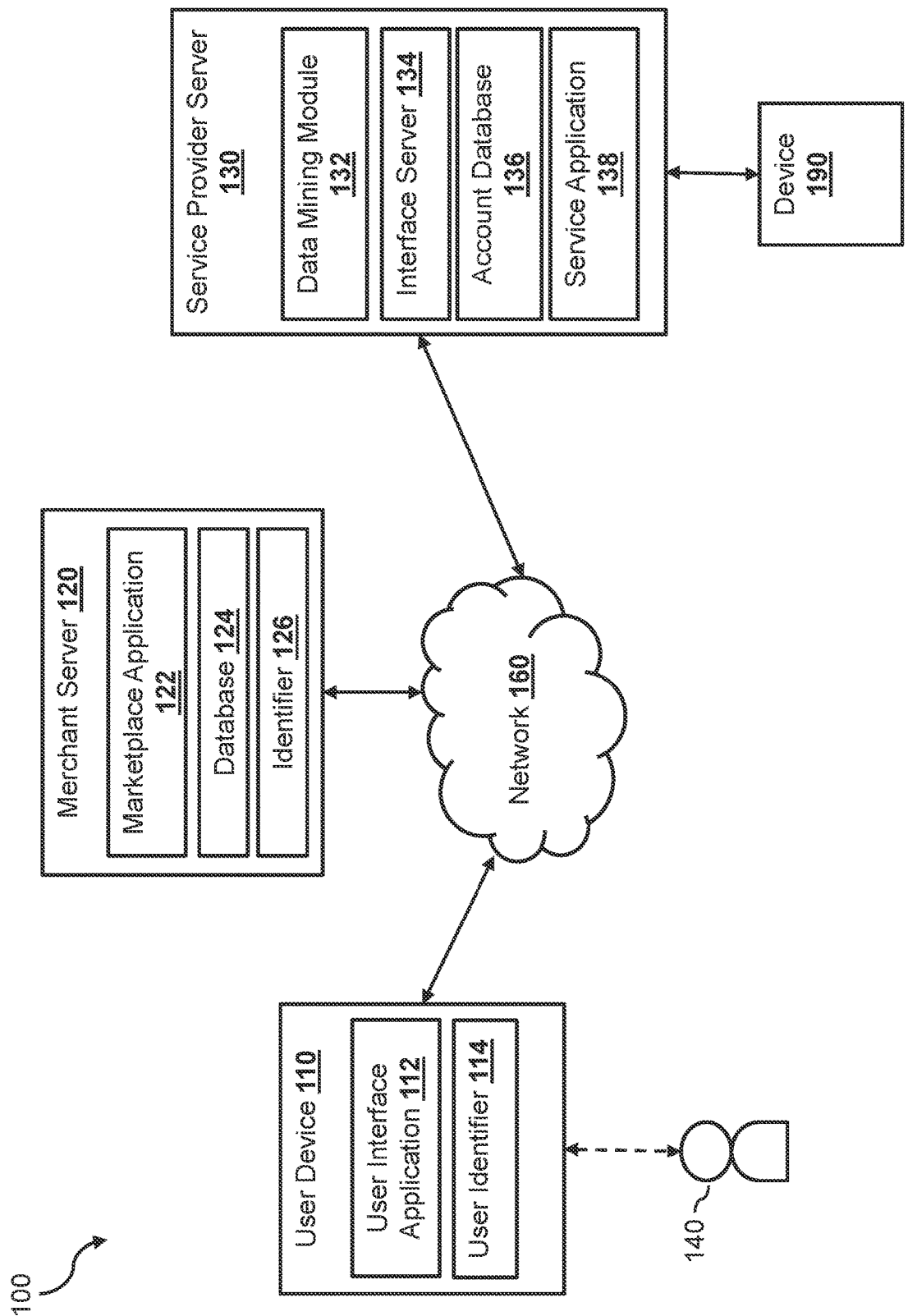
FIG. 1 is a block diagram illustrating a networked system that includes an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure includes methods and systems for mining data in association with predicting occurrences of events. As discussed herein, occurrences of an event may occur during the performance of certain activities. The event may correspond to an anomaly associated with an activity, a particular outcome (e.g., an undesirable outcome) when conducting an activity, or other types of incidents that occur during or after conducting an activity. For example, when a service provider processes electronic payment transactions, the processing of certain payment transactions may experience a downgrade (e.g., a delay in the processing of the transactions, etc.). In another example, some of the electronic payment transactions may experience a chargeback event (e.g., a refund, a reversal of a transaction, etc.) after the payment transactions have been processed. In yet another example, when different marketing campaigns have been produced, one or more of the marketing campaigns may not be as successful as others. The failure of a marketing campaign may also be considered an anomaly. Similarly, when different products and/or services of an organization are made available for sale, certain product/service may not be as successful (e.g., sales of the product/service did not meet expectation or a threshold). The failure of the product/service may also be considered an anomaly. Other types of events (e.g., different anomalies) may also be detected while performing any particular types of activities (e.g., processing electronic payment transactions, processing login attempts, processing database search queries, etc.).

Since the activities that are conducted by a system may include a large number of attributes (e.g., hundreds of attributes, thousands of attributes), when occurrences of an event are detected for some of the activities, it can be challenging for the system to quickly determine criteria that would lead to the event (e.g., which attributes and what attribute value ranges are relevant in predicting the occurrence of the event). For example, an electronic payment transaction may have hundreds of attributes, such as an amount of the payment transaction, identifiers of the payor and the payee, device characteristics of the devices used by the payor and the payee (e.g., a network address, a device manufacturer, an application type used by the device to facilitate the transaction, a screen resolution, etc.), a financial instrument type used in the transaction (e.g., a credit card, a gift card, etc.), whether credit was used in the transaction, a business category of a merchant, and other attributes. As such, whenever an event is detected, it may take a substantial amount of time to analyze the different attributes and attribute values associated with different activities to determine the criteria that can lead to the event. In one example, the system may configure classification engine (which can be implemented as a machine learning model) that can be trained to predict a likelihood of an occurrence of the event. However, without knowing which attributes are relevant, the system may configure the machine learning model to accept input values corresponding to all of the attributes (which can be hundreds or thousands of them) for performing the prediction. Using such a large number of input features may result in an overly complicated structure for the machine learning model, which in turn, would lead to a high consumption of time and computer processing resources during the training and the usage of the machine learning model.

As such, according to various embodiments of the disclosure, a data mining system may be configured to determine data (e.g., attributes, criteria, etc.) relevant to predicting an event. In some embodiments, when the one or more occurrences of an event is detected, the data mining system may perform the data mining process as disclosed herein based on data associated with the activities. For example, the data mining system may detect an occurrence of a new event (e.g., an event that has never occurred before). The data mining system may determine to perform the data mining process based on the detection of the new event. In another example, the data mining system may determine a change (or a shift) in the occurrences of the event (e.g., an increase in downgrade frequency when processing electronic payment transactions, etc.). The data mining system may determine to perform the data mining process based on the detected change.

The data associated with the activities and accessed by the data mining system may include attribute values corresponding to a set of attributes that is associated with the activities. For example, when the activities are related to processing electronic payment transactions, the data accessed by the data mining system may include an amount of the payment transaction, identifiers of the payor and the payee, device characteristics of the devices used by the payor and the payee (e.g., a network address, a device manufacturer, an application type used by the device to facilitate the transaction, a screen resolution, etc.), a financial instrument type used in the transaction (e.g., a credit card, a gift card, etc.), whether credit was used in the transaction, a business category of a merchant, and other attributes, and other values.

In some embodiments, based on the data associated with the activities, the data mining system may generate or access a decision tree for predicting occurrences of the event. The decision tree may include multiple split nodes. Each split node may split a path in the decision tree into two or more split paths based on one or more attributes and/or one or more criteria. For example, when the activities are related to processing electronic payment transactions, a split node may represent a criterion of "whether an amount of the transaction is larger than $500." The path in the decision tree leading to this split node may be split into two paths—a first path representing electronic payment transactions having an associated amount larger than $500 and a second path representing electronic payment transactions having an associated amount smaller or equal to $500. Activities that follow a particular path through the split nodes (e.g., based on whether the activities satisfy each of the criteria associated with the split nodes) may arrive at a leaf node in the decision tree. The leaf node may indicate a prediction score (e.g., a percentage of the activities that arrive at that leaf node), which represents a likelihood that an activity that reaches the leaf node is associated with the event.

In some embodiments, the data mining system may generate the decision tree by repetitively selecting an attribute, from the attributes related to the activities, and determining a criterion based on the attribute. For example, the data mining system may select a first attribute (e.g., an amount associated with the transaction) for the decision tree. The data mining system may also determine a criterion associated with the first attribute (e.g., whether the amount is larger than $500). Different embodiments may use different techniques to determine the criterion for the attribute. In some embodiments, when the attribute corresponds to a numerical value (e.g., an amount), the data mining system may determine a threshold based on the attribute values associated with the recorded activities (e.g., an average amount, a median amount, etc.). In some embodiments, the data mining system may determine the threshold based on a resulting percentage of activities that are associated with the event or not in each of the split paths. For example, the data mining system may determine the threshold to maximize (or minimize) the percentage of activities associated with the event in at least one of the split paths.

After generating the decision tree, the data mining system may access and traverse the decision tree and prune the decision tree based on a condition (also referred to as a "classification specification") related to the occurrences of the event. The condition can be determined by the data mining system automatically or determined based on user inputs. For example, the condition may include a threshold percentage (e.g., 10%, 20%, 50%, etc.) of activities being associated with the event (e.g., a threshold percentage of transactions that experience a downgrade, etc.).

Based on the condition, the data mining system may traverse the decision tree and prune at least a portion of the decision tree. For example, at every path within the decision tree that the data mining system traverses, the data mining system may determine whether the activities passing through the path satisfy the condition (e.g., among the transactions that pass through the path, whether the percentage of the transactions that have experienced a downgrade exceeds the threshold percentage). If it is determined that the activities passing through the path do not satisfy the condition, the data mining system may prune or remove the path and any subtree that is downstream to the path. On the other hand, if it is determined that the activities passing through the path satisfy the condition, the data mining system may continue to traverse the subtree (e.g., using a depth first search method) downstream from the path and performs the same pruning process at every downstream path that the data mining system traverses.

Using the pruning techniques disclosed herein, after pruning the decision tree, activities that are included within the remaining portion of the decision tree would satisfy the condition. In other words, the activities included in (that passed through) the remaining portion of the decision tree have a higher probability of being associated with the event (e.g., exceeding the threshold percentage) than the activities included in (that passed through) the pruned portion(s) of the decision tree.

In some embodiments, based on the remaining portion of the decision tree, the data mining system may change the condition (or prompt the user to change the condition). For example, when the remaining portion of the decision tree is over a threshold percentage of the original decision tree (meaning not enough portions of the tree have been pruned) or when the remaining portion of the decision tree is below a threshold percentage of the original decision tree (meaning too much of the tree have been pruned). The data mining system may change the condition (e.g., adjusting the threshold percentage), and perform the pruning process to the original decision tree again, until the remaining portion of the decision tree is satisfactory (e.g., within an acceptable range of percentage from the original tree). In some embodiments, the data mining system may present, via a user interface of a user device, information associated with the pruned decision tree (e.g., the attributes and or criteria associated with the remaining nodes in the pruned decision tree). Based on the data, a user may instruct the data mining system to change the condition. After changing the condition, the data mining system may perform the pruning process to the original decision tree, and may present the new data of the newly pruned decision tree to the user.

After pruning the decision tree, the data mining system may then extract attributes and/or criteria associated with the split nodes within the remaining portion of the decision tree. Using the example illustrated above in which the activities are related to processing electronic payment transactions, and the event is related to a processing downgrade, the criteria extracted from the decision tree may include: "amount>$500," "mobile device=true," and "application=web browser." Thus, the extracted attributes may include "transaction amount," "device used in transaction," and "application used in transaction." The extracted attributes and/or criteria may be more relevant in predicting the event than other attributes. Thus, based on the extracted attributes and/or criteria, the data mining system may perform one or more actions associated with the event.

In some embodiments, the data mining system may configure a machine learning model for predicting the event based on the extracted attributes. For example, since the extracted attributes are more relevant than other attributes in predicting the event (and much smaller in number than the entire set of attributes associated with the activities), the data mining system may configure the machine learning model based on a set of input features corresponding to the extracted attributes, such that the machine learning model may use attribute values corresponding to the extracted attributes to predict whether an activity would be associated with the event or not. In the example illustrated above, the data mining system may configure the machine learning model based on a set of input features that includes "transaction amount," "device used in transaction," and "application used in transaction." Since the input features determined based on the extracted attributes is much smaller than the entire set of attributes associated with the activities, configuring a machine learning model using the input features determined based on the extracted attributes, instead of using the entire set of attributes as input features, would improve the performance of the machine learning model.

The data mining system may also train the machine learning model using historical data (e.g., the data associated with the recorded activities, etc.). After training the machine learning model, the data mining system may use the trained machine learning model to classify new activities (e.g., classify incoming transactions to be processed by a service provider). For example, the data mining system may determine input values corresponding to the set of input features for the new activity, and may use the machine learning model to predict, based on the input values, a likelihood that the activity is associated with the event. In some embodiments, the data mining system may perform one or more actions to the new activity when the predicted value exceeds a threshold. For example, since the processing downgrade is usually caused by missing data or data mismatch between an authorization process and a settlement process, the data mining system may perform actions (e.g., verifying the accuracy and completeness of data, etc.) to a transaction before processing the transaction when the machine learning model predicts that the transaction has a high likelihood (e.g., when the output of the machine learning model exceeds a threshold) of experiencing a downgrade.

In some embodiments, the data mining system may segment the activities into different categories (e.g., different groups). For example, the data mining system may assign activities to a high risk group that includes activities having a high likelihood of being associated with the event or a low risk group that includes activities having a low likelihood of being associated with the event based on the extracted criteria. The data mining system may perform different actions to different segments of activities. For example, the data mining system may modify the security level of user accounts through which the activities in the high-risk group were conducted. The data mining system may also deny processing of future transactions through those user accounts. In another example, the data mining system may send incentives (e.g., discounts, rewards, etc.) to the user accounts through which activities in the low-risk group were conducted.

By using the techniques disclosed herein, causes and/or attributes that could lead to undesirable events (e.g., events that the service provider or one or more of the parties to a transaction would not want to occur or happen) can be quickly determined upon detecting the occurrences (or any changes in the occurrences) of certain events. The information extracted from the data mining process may improve how a computer system performs predictions of the occurrences of the events and/or how the computer system performs actions in reducing the occurrences of the undesirable events.

FIG. 1 illustrates a networked system 100, within which the data mining system may be implemented according to one embodiment of the disclosure. Note that the present techniques may be applied in many different computing and technological environments, however, and are not limited to those shown in the figures. The networked system 100 includes a service provider server 130, a merchant server 120, and a user device 110 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. For example, the user 140 may use the user device 110 to conduct an online transaction with the merchant server 120 via websites hosted by, or mobile applications associated with, the merchant server 120. The user 140 may also log in to a user account to access account services or conduct electronic transactions (e.g., account transfers or payments, accessing content or data, purchasing goods and/or services, etc.) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile payment application, etc.), which may be utilized by the user 140 to interact with the merchant server 120 and/or the service provider server 130 over the network 160. In one implementation, the user interface application 112 includes a software program (e.g., a mobile application) that provides a graphical user interface (GUI) for the user 140 to interface and communicate with the merchant server 120 and/or the service provider server 130 via the network 160. In another implementation, the user interface application 112 includes a browser module that provides a network interface to browse information available over the network 160. For example, the user interface application 112 may be implemented, in part, as a web browser to view information available over the network 160.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user 140 with a particular user account, a particular digital wallet, and/or a particular profile.

In various implementations, the user 140 is able to input data and information into an input component (e.g., a keyboard or microphone) of the user device 110. For example, the user 140 may use the input component to interact with the UI application 112 (e.g., to retrieve content from third-party servers such as the service provider server 130, etc.).

It has been contemplated that multiple user devices (each similar to the user device 110), may be connected to the network 160 to perform transactions with other devices (e.g., the user device 110, the merchant server 120, and/or the service provider server 130, etc.). Each of the other user devices may include similar hardware and software components as the user device 110 to enable their respective users to interact with the merchant server 120 and the service provider server 130 through the user devices.

The merchant server 120, in various embodiments, may be maintained by a business entity (or in some cases, by a partner of a business entity that processes transactions on behalf of business entity). Examples of business entities include merchants, resource information providers, utility providers, real estate management providers, social networking platforms, etc., which offer various items for viewing, accessing, and/or purchasing, and process payments for the purchases. As shown, the merchant server 120 may include a merchant database 124 for identifying available items, which may be made available to the user device 110 for viewing and purchase by the user.

The merchant server 120, in one embodiment, may include a marketplace application 122, which may be configured to provide information (e.g., displayable content) over the network 160 to the user interface application 112 of the user device 110. In one embodiment, the marketplace application 122 may include a web server that hosts a merchant website for the merchant. For example, the user 140 of the user device 110 may interact with the marketplace application 122 through the user interface application 112 over the network 160 to search and view various items available for access and/or purchase in the merchant database 124. The merchant server 120, in one embodiment, may be associated with at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

While only one merchant server 120 is shown in FIG. 1, it has been contemplated that multiple merchant servers, each associated with a different merchant, may be connected to the user device 110 and the service provider server 130 via the network 160.

The service provider server 130, in one embodiment, may be maintained by a transaction processing entity or an online service provider, which may provide processing for electronic transactions between different entities (e.g., among the users of the user devices 110, between a user and one or more business entity such as a merchant associated with the merchant server 120, other types of payees). As such, the service provider server 130 may include a service application 138, which may be adapted to interact with the user device 110 and/or the merchant server 120 over the network 160 to facilitate the searching, selection, purchase, payment of items, and/or other services offered by the service provider server 130. In one example, the service provider server 130 may be provided by PayPal®, Inc., of San Jose, California, USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities (e.g., between two users, between a user and a merchant, etc.). In one implementation, the payment processing application assists with resolving electronic transactions through validation, delivery, and settlement. As such, the payment processing application settles indebtedness between users and/or between a user and a merchant, wherein accounts may be directly and/or automatically debited and/or credited of monetary funds.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the interface server 134 may include pre-generated electronic content ready to be served to users. For example, the interface server 134 may store a log-in page and is configured to serve the log-in page to users for logging into user accounts of the users to access various services provided by the service provider server 130. The interface server 134 may also include other electronic pages associated with the different services (e.g., electronic transaction services, etc.) offered by the service provider server 130. As a result, a user (e.g., the user 140, a merchant associated with the merchant server 120, etc.) may access a user account associated with the user and access various services offered by the service provider server 130, by generating HTTP requests directed at the service provider server 130.

The service provider server 130, in one embodiment, may be configured to maintain one or more user accounts in an account database 136, each of which may be associated with a profile and may include account information associated with one or more individual users (e.g., the user 140 associated with user device 110, etc.). The account information may include an identifier of the user account, and other information associated with the user such as a gender, an age, demographic information, device information associated with devices associated with the user (e.g., a device identifier, an Internet Protocol (IP) address of the device, a residential address, an operating system version, screen attributes of the device, etc.). In one implementation, a user may have credentials to authenticate or verify identity with the service provider server 130. Thus, the service provider server may store the credentials of the users in corresponding records of the account database 136 associated with the user accounts. In some embodiments, the account database 136 may also store transaction data associated with transactions that have been conducted by users of the service provider sever 130. The transaction data may include attribute values corresponding to various attributes associated with transactions, such as a transaction amount, device information associated with a device used by the user to conduct the transaction, merchant (or payee) information, item purchased, method of payment, etc.

In various embodiments, the service provider server 130 also includes a data mining module 132 that implements the data mining system as discussed herein. The data mining module 132 may be configured to detect occurrences of events (e.g., anomalies) in association with activities conducted by the service provider server 130. For example, as the service provider server 130 processes electronic payment transactions for users, the data mining module 132 may detect occurrences of certain anomalies (e.g., performance downgrades) while processing of certain transactions. In another example, the data mining module 132 may detect occurrences of chargeback events associated with transactions that have been conducted by the service provider server 130. In some embodiments, the data mining system may automatically initiate a data mining process based on a detected condition related to the occurrences of the events. For example, the data mining module 132 may initiate a data mining process for an event when the data mining module 132 detects a first occurrence of such an event (e.g., upon detecting a first downgrade experience when processing a transaction, etc.). In another example, the data mining module 132 may initiate a data mining process for an event when the occurrences of the event exceeds a threshold (e.g., the number of occurrences exceeding a threshold number, a frequency of the occurrences exceeding a threshold frequency, etc.). The data mining module 132 may perform the data mining process for the event to determine a cause and/or attributes that could lead to the event. In some embodiments, the data mining module 132 may interact with a user of the device 190 while performing the data mining process. For example, the data mining module 132 may receive input parameters for performing the data mining process from the user of the device 190. The data mining module 132 may also present a result of the data mining process on the device 190.

Figure 2:
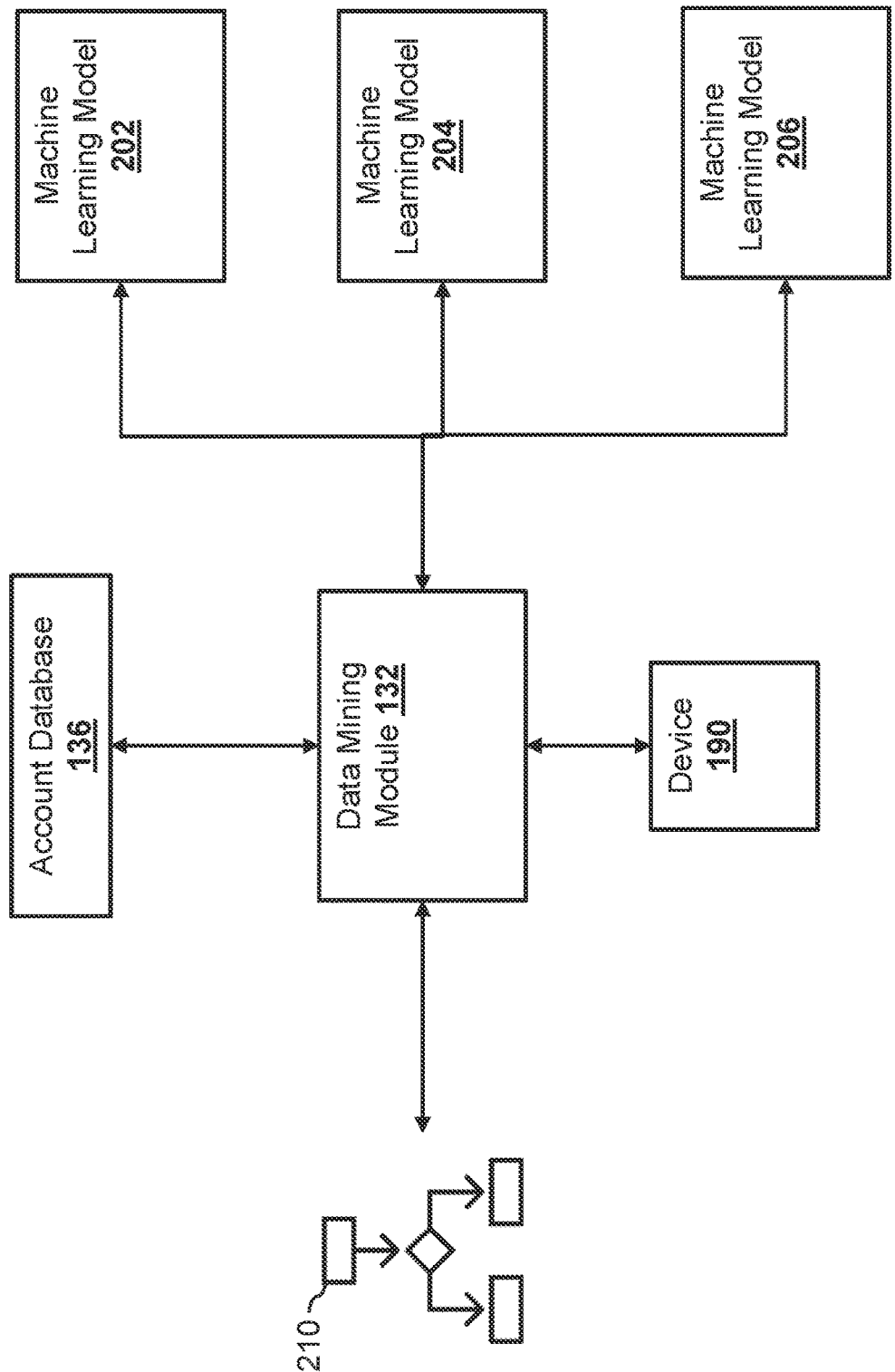
FIG. 2 illustrates an example data flow for mining data according to an embodiment of the present disclosure.

FIG. 2 illustrates an exemplary data flow for mining data in association with an event according to various embodiments of the disclosure. As discussed herein, upon detecting that the condition associated with an event exists, the data mining module 132 may investigate the event. For example, the data mining module 132 may retrieve and analyze data associated with the event and related activities to determine a cause and/or attributes that may lead to the occurrence of the event. Based on the result from the data mining process, the data mining module 132 may present relevant data (e.g., attributes and/or criteria that are relevant to segmenting activities based on the occurrence of events, etc.) on a user device (e.g., the device 190), such that a user of the device 190 may perform additional actions based on the result. The data mining module 132 may also use the relevant data to configure one or more machine learning models (e.g., the machine learning models 202, 204, and 206, etc.) for predicting the occurrence of the event.

To perform the data mining process for the event, the data mining module 132 may access data associated with the activities conducted by the service provider server 130 from the account database 136. The data accessed by the data mining module 132 may include activities that are associated with the event (e.g., transactions that have experienced a processing downgrade) and activities that are not associated with the event (e.g., transactions that have not experienced a processing downgrade). In some embodiments, the data associated with each activity may include attribute values corresponding to a set of attributes associated with the activity. For example, when the activities are related to processing electronic payment transactions, the set of attributes may include an amount of the payment transaction, identifiers of the payor and the payee, device characteristics of the devices used by the payor and the payee (e.g., a network address, a device manufacturer, an application type used by the device to facilitate the transaction, a screen resolution, etc.), a financial instrument type used in the transaction (e.g., a credit card, a gift card, etc.), whether credit was used in the transaction, a business category of a merchant, and other attributes. For certain activities, the set of attributes may include a large number of attributes (e.g., hundreds, thousands of attributes, etc.). It can be challenging for the service provider server 130 to analyze the large set of attributes to determine the cause of the occurrences of the event. As such, the data mining module 132 may use the data mining techniques disclosed herein to determine attributes and/or criteria that are more relevant to predicting the occurrences of the event than other attributes and/or criteria.

In some embodiments, based on the data associated with the activities, the data mining module 132 may generate a decision tree 210 configured to predict an occurrence of the event. For example, when the event is associated with a downgrade during the processing of transactions, the decision tree 210 may be generated to predict a likelihood that a transaction would experience a downgrade based on attribute values associated with the transaction.

In some embodiments, the data mining module 132 may generate the decision tree 210 by repetitively selecting an attribute, from the set of attributes related to the activities, and determining a criterion based on the attribute, until all of the attributes associated with the activities have been selected. For example, the data mining module 132 may select a first attribute (e.g., an amount associated with the transaction) for the decision tree 210. The data mining module 132 may then determine a criterion based on the first attribute (e.g., whether the amount is larger than $500). Different embodiments of the data mining module 132 may use different techniques to determine the criterion for the attribute. In some embodiments, when the attribute corresponds to a numerical value (e.g., an amount), the data mining module 132 may determine a threshold based on the attribute values associated with the recorded activities (e.g., an average amount from all of the recorded transactions, a median amount from all of the recorded transactions, etc.). In some embodiments, the data mining module 132 may determine the threshold based on a resulting percentage of activities that are associated with the event or not in each of the split paths. For example, the data mining module 132 may determine the threshold to maximize (or minimize) the percentage of activities associated with the event in at least one of the split paths. Thus, for the attribute associated with transaction amount, the data mining module 132 may determine the threshold for the criterion such that over a predetermined percentage of the transactions (e.g., 50%, 70%, 90%, etc.) that satisfy the criterion (e.g., transactions having transaction amounts over $500) have experienced downgrades.

The data mining module 132 may then generate a first split node in the decision tree based on the first attribute and the associated criterion. The data mining module 132 may also generate multiple split paths from the split node, where one path is associated with activities that satisfy the criterion and another path is associated with activities that do not satisfy the criterion. For example, the first split node generated by the data mining module 132 may represent the criterion of "whether a transaction amount of the transaction exceeds $500." The data mining module 132 may generate two split paths from the first split node—a first split path representing transactions having transaction amounts exceeding $500 and a second split path representing transactions having transaction amounts not exceeding $500.

The data mining module 132 may continue to select another attribute and determine criterion based on the attribute. For example, the data mining module 132 may select a second attribute (e.g., a device type of a device used by a payor of the transaction). In some embodiments, when the attribute is associated with a fixed number of different attribute values (e.g., different categories, etc.), the data mining module 132 may determine a criterion based on the attribute by selecting one or more of the attribute values. In the example where the attribute is associated with a device type, the attribute values associated with the device type attribute may include different device types, such as a mobile device type and a non-mobile device type. Thus, the data mining module 132 may determine a Boolean criterion for this device type attribute, such as a criterion associated with "whether the device type of the payor is a mobile device type."

The data mining module 132 may generate one or more split nodes in the decision tree 210 based on the second attribute and the associated criterion. In some embodiments, the data mining module 132 may generate a split node in the decision tree 210 for the second attribute in each of the split paths from the first split node representing the first attribute. Thus, the data mining module 132 may generate a second split node representing the second attribute and the associated criterion in the first split path coming from the first split node and a third split node representing the second attribute and the associated criterion in the second split path coming from the first split node.

The data mining module 132 may continue to generate split nodes and paths in the decision tree 210 based on different attributes and criteria. When all of the activities in a particular path (e.g., in a particular split path) is associated with an event (or is not associated with an event), the data mining module 132 may dispose a leaf node in the particular path. In addition, when all of the attributes have been considered along a path in the decision tree 210 (e.g., all of the attributes have been used by the split nodes along the path), the data mining module 132 may also dispose a leaf node at the end of that path.

Figure 3A:
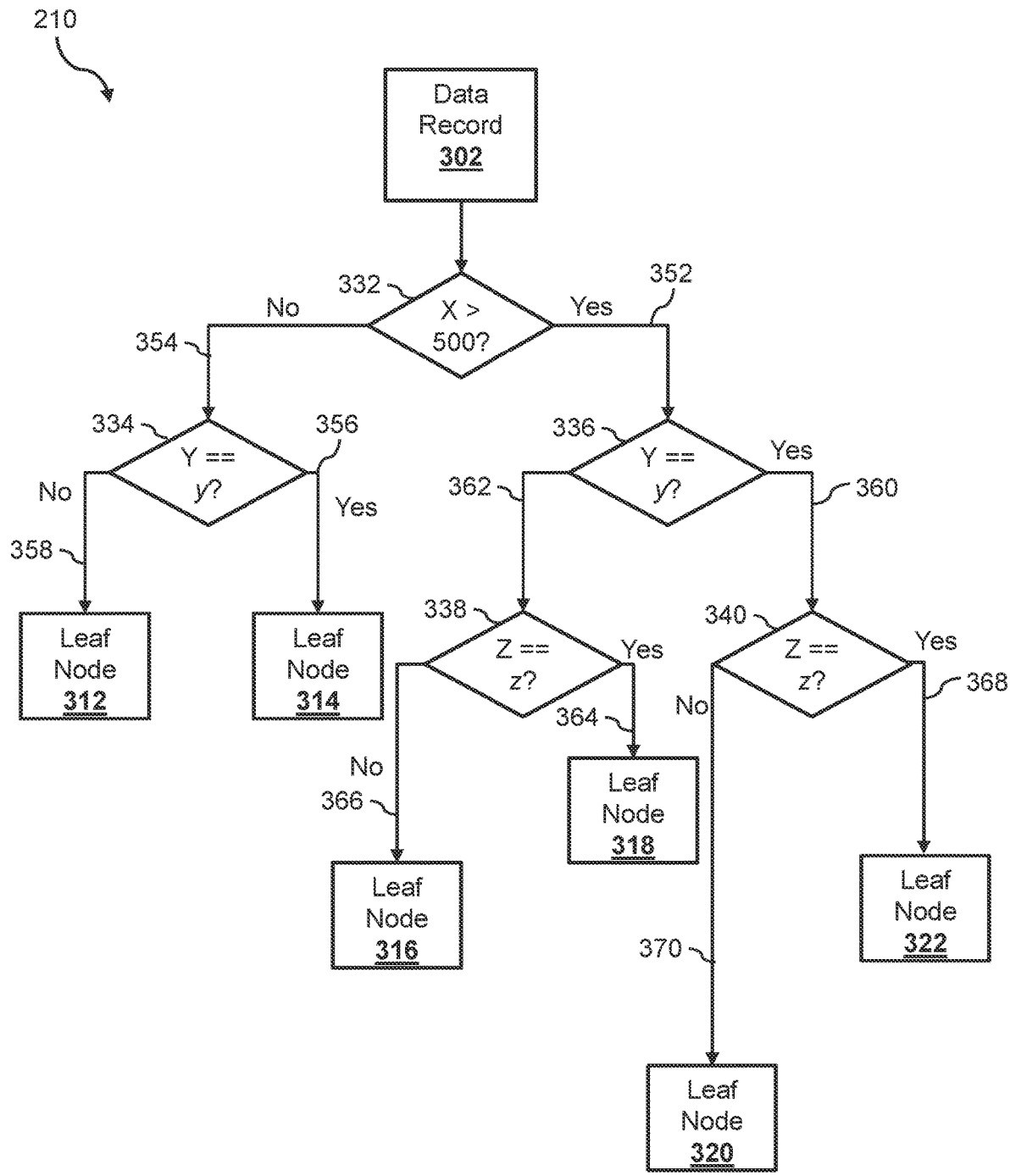
FIGS. 3A and B illustrate an example decision tree generated by a data mining system according to an embodiment of the present disclosure.

FIG. 3A illustrates the decision tree 210 (or a portion of the decision tree 210) generated by the data mining module 132 according to various embodiments of the disclosure. As shown, the decision tree 210 includes different split nodes 332, 334, 336, 338, and 340, and different split paths 352, 354, 356, 358, 360, 362, 364, 366, 368, and 370. Each of the split nodes 332, 334, 336, 338, and 340 may represent a particular attribute associated with the activities conducted by the service provider server 130 (e.g., processing electronic payment transactions, etc.). For example, the split node 332 represents the attribute 'X,' each of the split nodes 334 and 336 represents the attribute 'Y,' and each of the split nodes 338 and 340 represents the attribute 'Z,' where the attributes 'X,' 'Y,' and 'Z' may correspond to different attributes of the activities. Using the example in which the activities are associated with processing electronic payment transactions, the attribute 'X' may correspond to the transaction amount attribute, the attribute 'Y' may correspond to the device type attribute, and the attribute 'Z' may correspond to the funding source type attribute Each of the split nodes 332, 334, 336, 338, and 340 may also represent a criterion associated with the corresponding attribute. For example, the split node 332 may represent a criterion of whether the attribute 'X' is larger than 500 (e.g., whether the transaction amount is larger than $500). Each of the split nodes 334 and 336 may represent a criterion of whether the attribute 'Y' equals to the value 'y' (e.g., whether the device type is a mobile device type, etc.). Each of the split nodes 338 and 340 may represent a criterion of whether the attribute 'Z' equals to the value 'z' (e.g., whether the funding source type is a credit card, etc.).

The decision tree 210 also includes leaf nodes 312, 314, 316, 318, 320, and 322. Each of the leaf nodes 312, 314, 316, 318, 320, and 322 may represent a value (e.g., a score) that indicates a likelihood that the event is associated with activities that arrive at the particular leaf node. For example, a value of 100 in a leaf node may indicate that the activities that arrive at that leaf node has a 100% likelihood of being associated with the event (e.g., all of the transactions arriving at the leaf node would experience a downgrade), whereas a value of 0 in a leaf node may indicate that the activities that arrive at that leaf node have a 0% likelihood of being associated with the event (e.g., none of the transactions arriving at the leaf node would experience a downgrade).

As an activity (associated with a data record 302) passes through the decision tree, the activity starts with the first split node 332. The activity will be routed to either the split path 352 or the split path 354 based on whether the activity satisfies the criterion associated with the split node 332 (e.g., whether the attribute value of the activity corresponding to the attribute 'X' is larger than 500). The activity will go through different split paths in the decision tree 210 to arrive at one of the leaf nodes 312, 314, 316, 318, 320, or 322. The score of each leaf node may then be calculated based on a percentage of the activities that arrive at the leaf node being associated with the event.

The decision tree 210 as illustrated herein is generated based on three different attributes of the activities. However, when the activities are associated with more attributes, additional split nodes and split paths may be added to the decision tree 210. As such, one can imagine that the decision tree 210 may be much larger than what is shown in FIG. 3A when the number of attributes increases (e.g., in the hundreds, etc.).

After generating the decision tree 210, the data mining module 132 may access and traverse the decision tree 210 and prune the decision tree 210 based on a condition (e.g., classification specification) related to the occurrences of the event. The condition may be determined by the data mining module 132 automatically or determined based on user inputs and/or other factors. For example, the data mining module 132 may receive user inputs from the device 190 via a user interface. The data mining module 132 may also determine the set of criteria based on other factors, such as an overall percentage of activities that is associated with the event. For example, if the overall percentage of activities that is associated with the event is 25%, the data mining module 132 may determine a threshold percentage within a threshold deviation from the overall percentage (e.g., 20%, 30%, 35%, etc.). The condition may require a threshold percentage (e.g., 10%, 20%, etc.) of activities being associated with the event (e.g., a threshold percentage of transactions that have experienced downgrades, etc.).

Based on the condition, the data mining module 132 may traverse the decision tree 210 and prune at least a portion of the decision tree 210. For example, at every path (e.g., at every split path) within the decision tree 210 that the data mining module 132 traverses, the data mining module 132 may determine whether the activities passing through the path satisfy the condition (e.g., among the transactions that pass through the path, whether the percentage of the transactions that have experienced a downgrade exceeds the threshold percentage). If it is determined that the activities passing through the path do not satisfy the condition, the data mining module 132 may prune the path and any subtree downstream to the path. On the other hand, if it is determined that the activities passing through the path satisfy the condition, the data mining module 132 may continue to traverse the subtree (e.g., using a depth first search method) downstream from the path and perform the same pruning process at every downstream path that the data mining module 132 traverses. Using the pruning techniques disclosed herein, after pruning the decision tree 210, activities that are included within the remaining portion of the decision tree 210 would satisfy the condition. In other words, the activities included in the remaining portion of the decision tree have a higher probability of being associated with the event (e.g., exceeding the threshold percentage) than the activities included in the pruned portion(s) of the decision tree.

Thus, the data mining module 132 may start at the node 332 of the decision tree 210. The node 332 splits the path leading to the node 332 into two paths 352 and 352, where the path 352 is associated with activities that satisfy the criterion associated with the node 332 (e.g., activities having attribute 'X' greater than 500) and the path 354 is associated with activities that do not satisfy the criterion associated with the node 332 (e.g., activities having attribute 'X' not greater than 500). The data mining module 132 may traverse the path 354, and may determine whether the activities that pass through the path 354 satisfy the condition (e.g., among the activities that pass through the path 354, whether the percentage of the activities that are associated with the event exceeds the threshold percentage). In this example, the data mining module 132 may determine that the activities that pass through the path 354 do not satisfy the condition. Thus, the data mining module 132 may prune the path 354 and any subtree downstream from the path 354, including the split node 334, the split paths 356 and 358, and the leaf nodes 312 and 314.

The data mining module 132 may then proceed to traverse the other split path 352 from the split node 332. In this example, the data mining module 132 may determine that the activities that pass through the path 352 satisfy the condition. Thus, the data mining module 132 may continue to traverse the subtree downstream from the path 352 and perform the pruning process in the subtree.

Figure 3B:
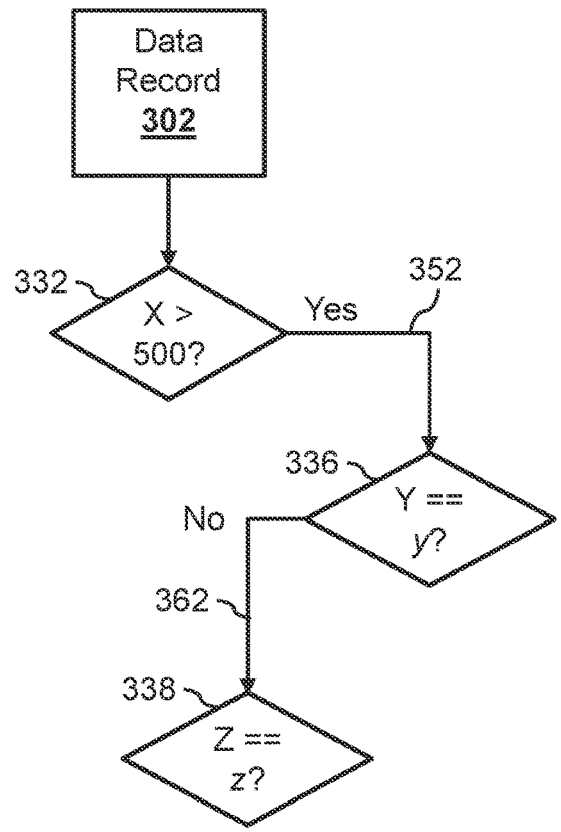

FIG. 3B illustrates a decision tree 300, which is a portion of the decision tree 210 after the decision tree 210 has been pruned using the pruning techniques described herein. As shown, several portions (subtrees) of the decision tree 210 have been pruned using the techniques described herein. The remaining decision tree 300 includes the nodes 332, 336, and 338, and the paths 352 and 362. Out of the remaining nodes 332, 336, and 338, only the nodes 332 and 336 have split paths (e.g., the paths 352 and 362) leading out of the nodes, where no path leads out of the node 338. Having a split path leading out of a node in the remaining decision tree 300 may indicate that the attribute (and/or criterion) associated with the node is useful in predicting occurrences of the event, since the activities included in the remaining split path satisfy the condition.

In some embodiments, the data mining module 132 may analyze the remaining portion of the decision tree 300 to determine relevant information associated with the event. For example, the data mining module 132 may extract a set of attributes (e.g., a set of features) that are relevant in predicting the occurrence of the event based on the pruned decision tree 300. In this example, based on the decision tree 300, the data mining module 132 may determine that the attributes 'X' and 'Y' (e.g., the transaction amount attribute and the device type attribute) associated with the nodes 332 and 336 are more relevant in predicting the occurrence of the event than other attributes associated with the activities, since one or more split path leads out of the nodes 332 and 336. Since the number of attributes that are associated with the activities may be large (e.g., hundreds, thousands, etc.), reducing the number of attributes that are associated with the activities to a smaller subset (that have a higher relevancy in predicting the event than the to the attributes) would improve the computer performance (e.g., increasing the speed and reducing the required computer resources) of a system when performing processes associated with the activities.

In some embodiments, the data mining module 132 may perform one or more actions in association with the event based on the information derived from the decision tree 300. For example, since the data mining module 132 determines that the attributes 'X' and 'Y' are more relevant in predicting the occurrence of the event than other attributes associated with the activities (e.g., the attribute 'Z'), the data mining module 132 may configure one or more machine learning models (e.g., the machine learning models 202, 204, and 206) to predict the occurrence of the event based on the attributes 'X' and 'Y,' and not other attributes.

Figure 4:
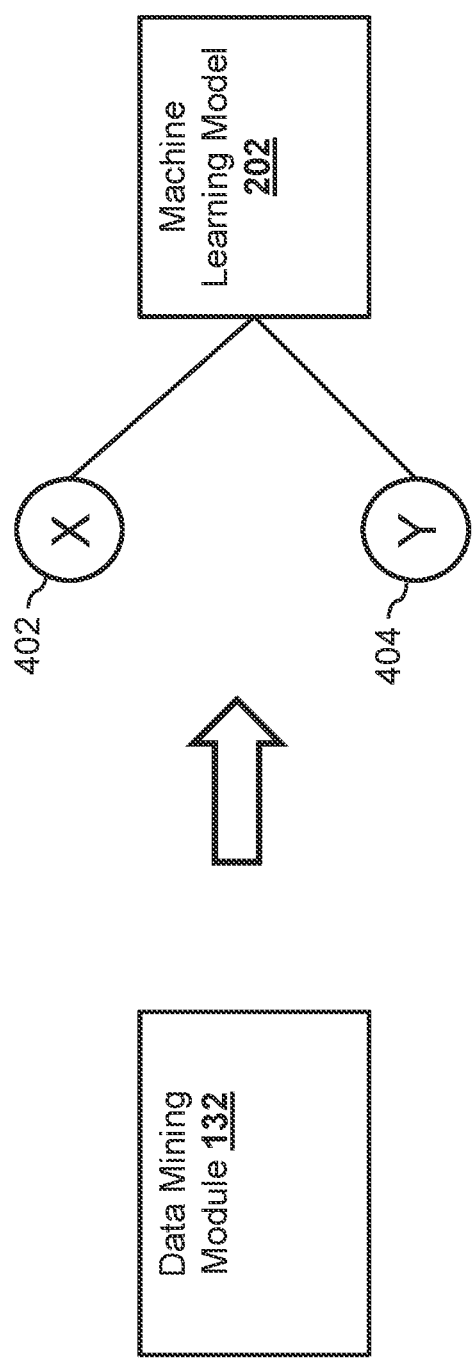
FIG. 4 illustrates an example of pruning a decision tree according to an embodiment of the present disclosure.

FIG. 4 illustrates an example of using the information derived from the decision tree 300 to configure and/or modify a machine learning model. As shown in FIG. 4, the data mining module 132 may configure the machine learning model 202 to use input features 402 and 404 corresponding to the attributes 'X' and 'Y' for predicting a likelihood that an activity is associated with an event. The data mining module 132 may then train the machine learning model 202 to predict the occurrence of the event based on the set of input features. The data mining module 132 may then use the trained machine learning model 202 to predict likelihoods that future activities are associated with the event (e.g., the likelihood that a transaction would experience a downgrade, etc.), and may perform an action to the activities that are predicted to have a likelihood of being associated with the event higher than a threshold (e.g., for the transactions that are predicted to have a likelihood of experiencing a downgrade higher than a threshold, perform a data verification process to ensure that the data is accurate and complete before processing the transactions, etc.).

In some embodiments, the data mining module 132 may use the relevant criteria derived from a pruned decision tree to perform one or more actions. Referring back to FIG. 3B, the data mining module 132 may determine that activities that satisfy the criterion associated with the node 332 (e.g., the 'YES' path 352) and the activities that do not satisfy the criterion associated with the node 336 (e.g., the 'NO' path 362) have a higher likelihood of being associated with the event, as the paths 352 and 362 are the remaining paths in the decision tree 300. In other words, activities having an attribute value corresponding to the attribute 'X' larger than 500 and/or having an attribute value corresponding to the attribute 'Y' that is not 'y' have a higher likelihood of being associated with the event. Thus, the data mining module 132 may determine a set of criteria (e.g., attribute 'X' being larger than 500 and attribute 'Y' not being 'y') for segmenting the activities. Activities that satisfy the set of criteria may be classified as one group (e.g., a high-risk group, etc.) and activities that do not satisfy the set of criteria may be classified as another group (e.g., a low-risk group, etc.). The data mining module 132 may then perform an action to the entire group of activities (e.g., the high-risk group), or to user accounts through which the group of activities were conducted. For example, the data mining module 132 may increase the security level to the user accounts through which the risk group of activities were conducted. In another example, the data mining module 132 may pre-process activities that satisfy the set of criteria in order to reduce the likelihood that the activities would experience the event.

Figure 5:
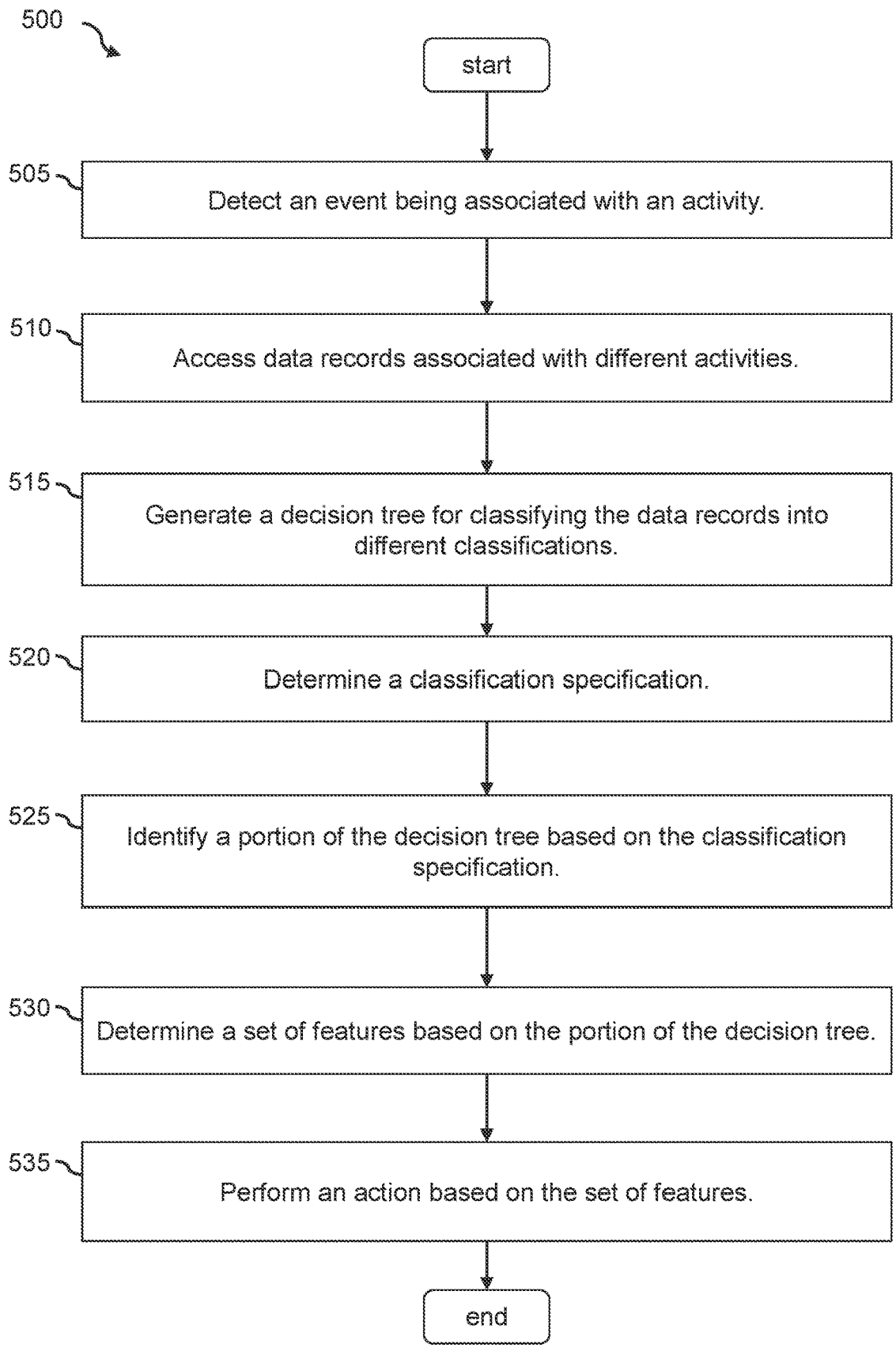
FIG. 5 illustrates a flowchart showing a process of mining data for predicting occurrences of an event according to an embodiment of the present disclosure.

FIG. 5 illustrates a process 500 for mining data in association with an event according to various embodiments of the disclosure. In some embodiments, at least a portion of the process 500 may be performed by the data mining module 132. The process 500 may begin by detecting (at step 505) an event being associated with an activity. For example, the data mining module 132 may detect an occurrence of an event in association with an activity (e.g., a transaction experiencing a downgrade). Specifically, the data mining module 132 may detect a new occurrence of the event in association with the activity, or detect that the occurrence of the event has exceeded a threshold (e.g., the number of occurrences, a frequency of the occurrences, etc.).

The process 500 then accesses (at step 510) data records associated with different activities and generates (at step 515) a decision tree for classifying the data records into different classifications. For example, the data mining module 132 may access data associated with the activities that have been conducted by the service provider server 130 (e.g., transactions processed by the service provider server 130) from the account database 136. The data mining module 132 may then generate a decision tree (e.g., the decision tree 210) based on the data accessed from the account database 136 and different attributes associated with the activities. The decision tree may include multiple split nodes, where each split node splits a path in the decision tree into two or more paths based on a criterion associated with an attribute. An activity may follow a particular path to arrive at a leaf node in the decision tree based on whether or not the activity satisfies the criteria associated with the different split nodes.

After generating the decision tree, the process 500 determines (at step 520) a classification specification and identifies (at step 525) a portion of the decision tree based on the classification specification. For example, the data mining module 132 may determine a classification specification automatically or based on inputs from a user. The classification specification may specify a percentage threshold of activities that are associated with the event. Thus, in some embodiments, the data mining module 132 may determine the classification specification based on an overall ratio of the activities (e.g., a ratio between the number of activities associated with the event and the number of activities not associated with the event). Based on the classification specification, the data mining module 132 may traverse the decision tree (e.g., the decision tree 210) and may prune one or more portions of the decision tree 210 that do not satisfy the classification specification (e.g., pruning the paths in which activities do not satisfy the threshold percentage). As such, the remaining portion(s) of the decision tree (e.g., the decision tree 300) represents the paths through which activities having a higher likelihood of being associated with the event would pass.

The process 500 then determines (at step 530) a set of features based on the portion of the decision tree and performs (at step 535) an action based on the set of features. For example, the data mining module 132 may determine attributes and/or criteria that are more relevant in predicting the occurrence of the event than other attributes and/or criteria based on the remaining portion of the decision tree (e.g., the decision tree 300). In some embodiments, the data mining module 132 may extract the attributes that are associated with the remaining portion of the decision tree (e.g., the attributes 'X' and 'Y'), and may configure a machine learning model to predict occurrences of the event using a set of input features corresponding to these attributes. The data mining module 132 may then train the machine learning model using historical data (e.g., the data associated with the recorded activities accessed from the account database 136, or other sets of training data). When a new activity is detected, the data mining module 132 may use or access the previously trained machine learning model to predict a likelihood that the activity is associated with the event (e.g., a likelihood that a transaction would experience a downgrade). The data mining module 132 may perform an action to the activity if the predicted likelihood exceeds a threshold (e.g., verify the accuracy and completeness of data before processing the transaction, etc.) in order to the reduce the frequency of the occurrences of the event.

In some embodiments, the data mining module 132 may extract a set of criteria based on the remaining paths in the decision tree. The data mining module 132 may then segment activities (and/or user accounts) based on the set of criteria and may perform actions to a particular group of activities and/or a particular group of user accounts (e.g., user accounts through which the group of activities were conducted). For example, the data mining module 132 may modify a security level of the user accounts within the particular group of user accounts.

Figure 6:
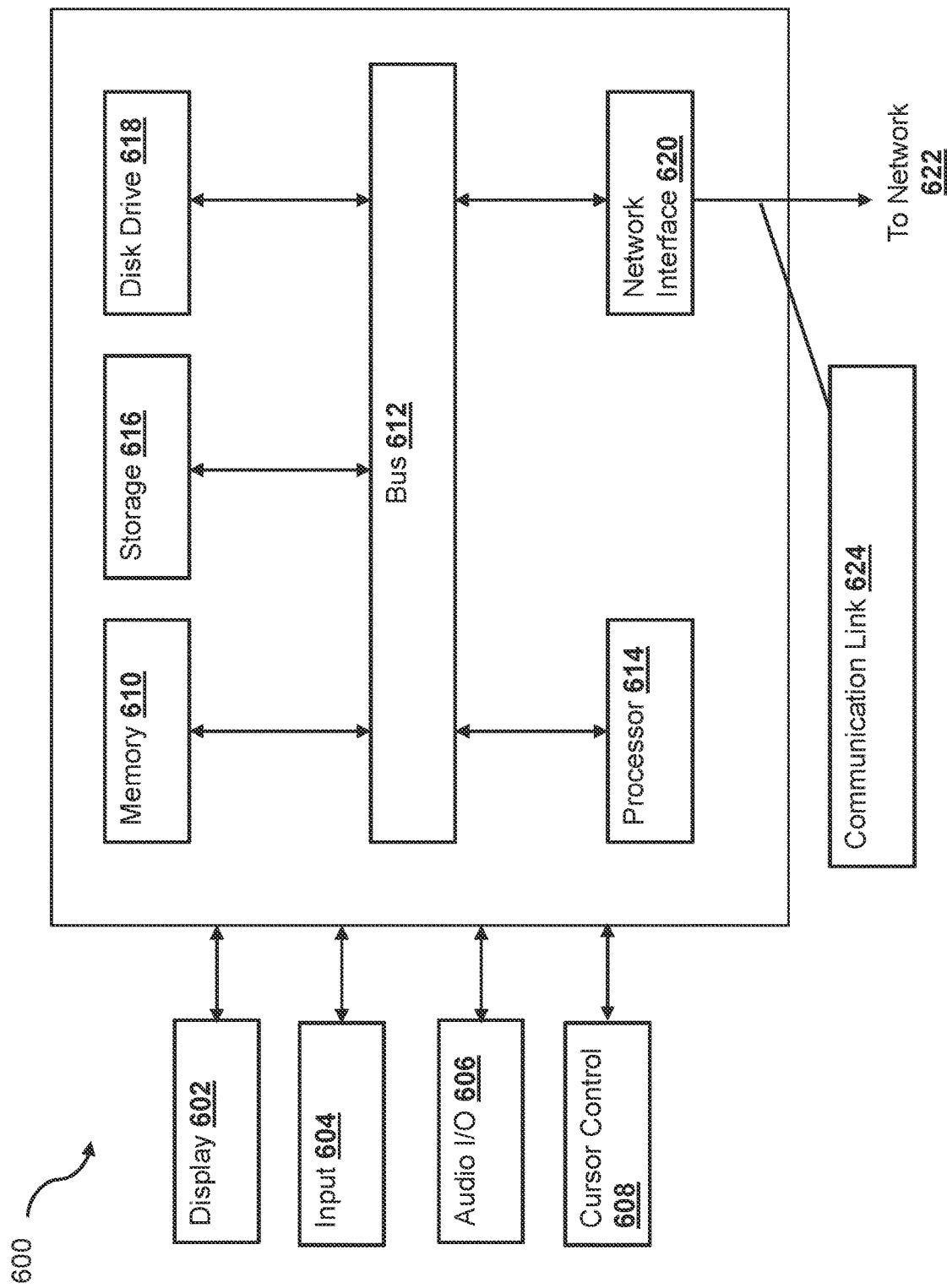
FIG. 6 is a block diagram of a system for implementing a device according to an embodiment of the present disclosure.

FIG. 6 is a block diagram of a computer system 600 suitable for implementing one or more embodiments of the present disclosure, including the service provider server 130, the merchant server, the user device 110, and the device 190. In various implementations, each of the devices 110 and 190 may include a mobile cellular phone, personal computer (PC), laptop, wearable computing device, etc. adapted for wireless communication, and the service provider server 130 may include a network computing device, such as a server. Thus, it should be appreciated that the devices/servers 110, 120, 130, and 190 may be implemented as the computer system 600 in a manner as follows.

The computer system 600 includes a bus 612 or other communication mechanism for communicating information data, signals, and information between various components of the computer system 600. The components include an input/output (I/O) component 604 that processes a user (i.e., sender, recipient, service provider) action, such as selecting keys from a keypad/keyboard, selecting one or more buttons or links, etc., and sends a corresponding signal to the bus 612. The I/O component 604 may also include an output component, such as a display 602 and a cursor control 608 (such as a keyboard, keypad, mouse, etc.). The display 602 may be configured to present a login page for logging into a user account or a checkout page for purchasing an item from a merchant. An optional audio input/output component 606 may also be included to allow a user to use voice for inputting information by converting audio signals. The audio I/O component 606 may allow the user to hear audio. A transceiver or network interface 620 transmits and receives signals between the computer system 600 and other devices, such as another user device, a merchant server, or a service provider server via a network 622, such as network 160 of FIG. 1. In one embodiment, the transmission is wireless, although other transmission mediums and methods may also be suitable. A processor 614, which can be a micro-controller, digital signal processor (DSP), or other processing component, processes these various signals, such as for display on the computer system 600 or transmission to other devices via a communication link 624. The processor 614 may also control transmission of information, such as cookies or IP addresses, to other devices.

The components of the computer system 600 also include a system memory component 610 (e.g., RAM), a static storage component 616 (e.g., ROM), and/or a disk drive 618 (e.g., a solid-state drive, a hard drive). The computer system 600 performs specific operations by the processor 614 and other components by executing one or more sequences of instructions contained in the system memory component 610. For example, the processor 614 can perform the data mining functionalities described herein according to the process 500.

Logic may be encoded in a computer readable medium, which may refer to any medium that participates in providing instructions to the processor 614 for execution. Such a medium may take many forms, including but not limited to, non-volatile media, volatile media, and transmission media. In various implementations, non-volatile media includes optical or magnetic disks, volatile media includes dynamic memory, such as the system memory component 610, and transmission media includes coaxial cables, copper wire, and fiber optics, including wires that comprise the bus 612. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 600. In various other embodiments of the present disclosure, a plurality of computer systems 600 coupled by the communication link 624 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
   a non-transitory memory; and
   one or more hardware processors coupled with the non-transitory memory and configured to read instructions from the non-transitory memory to cause the system to perform operations comprising:
   detecting an occurrence of an anomaly in association with a transaction;
   obtaining a plurality of data records associated with a plurality of transactions, wherein each data record in the plurality of the data records corresponds to a corresponding transaction and comprises (i) attribute values corresponding to a plurality of attributes and (ii) a label indicating whether the anomaly has occurred for the corresponding transaction;

generating a decision tree configured to predict occurrences of the anomaly based on the plurality of data records, wherein the decision tree comprises a plurality of nodes, and wherein each node in the plurality of nodes corresponds to a condition associated with an attribute from the plurality of attributes;

feeding the plurality of data records through the decision tree;

determining, for each node of the plurality of nodes in the decision tree, characteristics of data records from the plurality of data records that pass through the node;

pruning a first portion of the decision tree based on first characteristics of first data records from the plurality of data records that pass through the first portion of the decision tree satisfying a set of criteria;

identifying a set of attributes corresponding to one or more nodes within a second portion of the decision tree; and configuring a classification engine to use the set of attributes as input features for detecting occurrences of the anomaly in transactions.

2. The system of claim 1, wherein the classification engine comprises a machine learning model, and wherein the operations further comprise:

training the machine learning model.

3. The system of claim 1, wherein the operations further comprise:

receiving transaction data associated with a particular transaction;

determining, for the particular transaction, a set of input values corresponding to the set of attributes based on the transaction data;

determining, using the classification engine and based on the set of input values, a classification for the particular transaction; and processing the particular transaction based on the transaction data and the classification.

4. The system of claim 3, wherein the processing the particular transaction comprises authorizing or declining the particular transaction based on the classification.

5. The system of claim 1, wherein the set of criteria comprises a minimum percentage threshold requirement for transactions associated with the anomaly.

6. The system of claim 1, wherein the operations further comprise:

receiving user inputs from a user device; and determining the set of criteria based on the user inputs.

7. The system of claim 1, wherein the operations further comprise:

determining, from a second plurality of transactions, a portion of the second plurality of transactions that falls within the second portion of the decision tree; and performing an action to user accounts through which the portion of the second plurality of transactions was conducted.

8. A method, comprising:

accessing, by a computer system, data records associated with a plurality of activities conducted via a service provider, wherein each data record in the plurality of the data records corresponds to a corresponding activity and comprises (i) attribute values corresponding to a plurality of attributes and (ii) a label indicating whether an event is associated with the corresponding activity;

generating, by the computer system, a decision tree configured to predict occurrences of the event based on the plurality of data records, wherein the decision tree comprises a plurality of nodes, and wherein each node in the plurality of nodes corresponds to a condition associated with an attribute from the plurality of attributes;

providing, by the computer system, the plurality of data records to the decision tree;

determining, for each node of the plurality of nodes in the decision tree, characteristics of data records from the plurality of data records that pass through the node;

pruning, by the computer system, a first portion of the decision tree based on first characteristics of first data records from the plurality of data records that pass through the first portion of the decision tree satisfying a set of criteria;

identifying, by the computer system, a set of attributes corresponding to one or more nodes within a second portion of the decision tree; and configuring a machine learning model to use the set of attributes as input features for detecting occurrences of the event.

9. The method of claim 8, wherein the set of attributes includes a subset, but not all, of the plurality of attributes.

10. The method of claim 8, further comprising:

training the machine learning model based on the set of attributes.

11. The method of claim 8, further comprising:

receiving activity data associated with a particular activity;

determining, for the particular activity, a set of input values corresponding to the set of attributes based on the activity data;

determining, using the machine learning model and based on the set of input values, a likelihood that the event is associated with the particular activity; and processing the particular activity based on the activity data and the likelihood.

12. The method of claim 8, further comprising:

deriving a second set of criteria from the second portion of the decision tree;

segmenting a second plurality of activities into a first group and a second group based on the second set of criteria, wherein the first group includes first activities from the second plurality of activities that satisfy the second set of criteria, and wherein the second group includes second activities from the second plurality of activities that do not satisfy the second set of criteria; and performing an action to the first activities.

13. The method of claim 12, wherein the action comprises:

verifying transaction data associated with the first activities.

14. The method of claim 8, further comprising:

traversing the decision tree using a depth-first search method, wherein the determining the characteristics of the data records is based on the traversing the decision tree.

15. A non-transitory machine-readable medium having stored thereon machine-readable instructions executable to cause a machine to perform operations comprising:

obtaining a plurality of data records associated with a plurality of transactions, wherein each data record in the plurality of the data records corresponds to a corresponding transaction and comprises (i) attribute values corresponding to a plurality of attributes and (ii) a label indicating whether an event is associated with the corresponding transaction;

generating a decision tree configured to predict the occurrences of the event based on the plurality of data records, wherein the decision tree comprises a plurality of nodes, and wherein each node in the plurality of nodes corresponds to a condition associated with an attribute from the plurality of attributes;

providing the plurality of data records to the decision tree;

determining, for each node of the plurality of nodes in the decision tree, characteristics of data records from the plurality of data records that pass through the node;

pruning a first portion of the decision tree based on first characteristics of first data records from the plurality of data records that pass through the first portion of the decision tree satisfying a set of criteria;

determining a set of attributes corresponding to one or more nodes within a second portion of the decision tree; and configuring a classification engine to use the set of attributes as input features for detecting occurrences of the event in transactions.

16. The non-transitory machine-readable medium of claim 15, wherein the classification engine comprises a machine learning model, and wherein the operations further comprise:

training the machine learning model.

17. The non-transitory machine-readable medium of claim 15, wherein the operations further comprise:

receiving transaction data associated with a particular transaction;

determining, for the particular transaction, a set of input values corresponding to the set of attributes based on the transaction data;

determining, using the classification engine and based on the set of input values, a classification for the particular transaction; and processing the particular transaction based on the transaction data and the classification.

18. The non-transitory machine-readable medium of claim 17, wherein the processing the particular transaction comprises authorizing or declining the particular transaction based on the classification.

19. The non-transitory machine-readable medium of claim 15, wherein the set of criteria comprises a minimum percentage threshold requirement for transactions associated with the event.

20. The non-transitory machine-readable medium of claim 15, wherein the operations further comprise:

determining that the pruned decision tree fails to satisfy a predetermined requirement; and modifying the set of criteria.

* * * * *